Patented May 8, 1945

2,375,715

UNITED STATES PATENT OFFICE 2,375,715

METHOD OF PREPARING BARIUM ALUMINATE

Francis J. Williams, Port Washington, N. Y., assignor to National Lead Company, New York, N. Y., a corporation of New Jersey No Drawing. Application October 24, 1941, Serial No. 416,375

4 Claims. (Cl. 23—52)

The present invention relates to the preparation of barium aluminates. It has particular reference to methods for the preparation of barium aluminates which involve the thermal decomposition of barium sulfate.

The principal object of the present invention is to provide a simple and efficient method for the production of barium aluminates. Another object of the invention is to produce by thermal decomposition of barium sulfate, barium aluminates which are substantially free from residual sulfur compounds of barium. A third is to provide a method for the production of barium aluminates by reactions in the solid state. A fourth object of the invention is to produce barium aluminates in less time than has heretofore been possible. These and other objects of the invention will become apparent from this description thereof.

The prior art has indicated that if alumina, or an aluminum salt which on heating produces alumina, is mixed in the correct proportions with barium carbonate or barium oxide, and this mixture furnaced at a sufficient temperature for a sufficient length of time, that tribarium aluminate would result. It has also been pointed out that the addition of alumina to barium sulfate reduced the temperature at which it was possible to decompose barium sulfate. However, mixtures of barium sulfate and alumina, when furnaced, will yield a product which is in part composed of a barium aluminate but which in addition also contains considerable residual barium sulfate.

Theories with respect to reactions in the solid state say that the rate of reaction is inversely proportional to the radius squared of the particles being heated in contact. It should then follow that a reduction of the particle size of the component materials in the furnace mix should result in an increased rate of reaction. Apparently, this is essentially true in the early stages of the heating. However, with a decrease in particle size, produced by additional grinding of the batch of barium sulfate and alumina, the reaction rate falls off considerably from that which would be expected by theory and the barium sulfate content of the resultant product may be as great or greater than that obtained without this additional grinding.

An increase in the temperature of furnacing should also increase the reaction rate. In this particular reaction, however, an increase in temperature is not advisable. Barium sulfate melts at about 1580° C. and, while the presence of a liquid phase may momentarily increase the reaction rate, it has been observed that the ultimate effect is to retard the reaction. If the furnace charge were to be kept fluid throughout the entire furnacing operation and discharged from the furnace as a fluid mass, it should be possible to eliminate completely the sulfur from the mix and produce a product consisting essentially of barium aluminate. This operation has two serious disadvantages. A molten charge originating from a batch containing barium sulfate and alumina is extremely corrosive toward refractory materials, particularly when the barium content is high. In addition, the system BaO—Al$_2$O$_3$ is completely solid at temperatures above 1600° C. so that it would be necessary to operate at a temperature higher than this.

A further technique which has been proposed is the addition of a reducing agent, such as carbon, to the mixture of barium sulfate and alumina. The behavior of such a reducing agent may be illustrated by the following equations:

$$BaSO_4 + 2C = BaS + 2CO_2$$

$$3BaSO_4 + BaS = 4BaO + 4SO_2$$

$$3BaO + Al_2O_3 = Ba_3Al_2O_6$$

or $$6BaSO_4 + 3C + 2Al_2O_3 = 2Ba_3Al_2O_6 + 3CO_2 + 6SO_2$$

This series of reactions is theoretically correct, but due to mechanical difficulties, a complete elimination of sulfur is not possible. A mixture of barium sulfate and barium sulfide will produce an eutectic liquid at a temperature of about 1410° C. This liquid phase tends to reduce the porosity of the mix and stops the sulfur elimination as mentioned above. At 1500° C. such a mixture will melt sufficiently to stick to the furnace walls and on continued heating the liquid phase diminishes in quantity until the charge freezes on the furnace walls. The final product is contaminated with either barium sulfate or barium sulfide or both, depending on the amount of carbon used in the batch as well as on the furnace atmosphere. The barium sulfide is particularly hard to remove since in the presence of Al$_2$O$_3$ it forms barium thio-aluminates. These are objectionable in the product, since on hydrolysis they yield hydrogen sulfide.

In the commercial production of barium aluminates, it is economically feasible to use native barite ore and native bauxite ore as the sources, respectively, of barium sulfate and alumina. Both of these native ores contain impurities, chief of which are ferric oxide and silica. While the presence of these impurities is not detrimental in the finished product for many of the proposed uses of barium aluminates, they are apt to be detrimental in the production of the aluminates. These impurities have the effect, at elevated temperatures, of producing a liquid phase by lowering the eutectic temperature of the system and thus preventing the reaction from going to substantial completion, as previously described. These above mentioned difficulties may explain why barium aluminates have not been produced commercially to any great extent prior to this invention.

In its broadest aspect this invention contemplates the production of barium aluminates by heating a barium sulfate material with an aluminum oxide material under oxidizing conditions until the barium sulfate content of the mixture is materially diminished, thereafter continuing the heating under reducing conditions until the sulfur content of the mixture is substantially completely eliminated. The term "barium sulfate material" as herein used is meant to include not only barium sulfate as such, for instance, blanc fixe, but also native forms of this material, for example, barytes, barite, etc. The expression "aluminum oxide material" is meant to include not only aluminum oxide, but materials such as bauxite and aluminum hydrate which, on heating, yield aluminum oxide.

According to the invention, an intimate mixture of a barium sulfate material, e. g., barite and aluminum oxide material, e. g., bauxite, in predetermined portions to yield a barium aluminate of desired ratio of BaO to $Al_2O_3$ reduced to a fineness of, say, 100 mesh, is introduced into a suitable furnace either in dry or wet condition.

Following the introduction into the suitable furnace this mixture is then heated under oxidizing conditions at a temperature sufficiently high to bring about the formation of barium aluminate with the elimination of sulfur dioxide until only a minor portion of the barium sulfate, i. e., an amount less than half the entire charge, is present. The conditions are then changed from oxidizing to reducing and the heating continued until substantially all of the barium sulfate is eliminated, i. e., not over a few percent of barium sulfate remains in the final product.

This invention makes possible the production of barium aluminates in a simple manner, circumventing the difficulties which have been mentioned. An intimate mixture of barite and bauxite in proper proportions, reduced to a fineness of about 100 mesh, is introduced into a furnace in a dry or wet condition. Any suitable furnace capable of withstanding a temperature of 1550° C. will serve for the furnacing operation, but preferably a rotary kiln is used. A high alumina refractory has been found to be desirable as a furnace lining material. This rotary kiln may be operated either continuously, if desired, and may be heated by the combustion of a suitable fuel such as coal, oil or gas. If the operation is to be continuous, the type of kiln used in the manufacture of Portland cement is employed. The charge is heated to temperatures between about 1400° C. and about 1550° C. until the desired decrease in the barium sulfate content of the batch is effected. The duration of this initial heating under oxidizing conditions and the resulting decrease in the barium sulfate content may be varied, depending upon the size of the batch being heated. When operating with large commercial batches, as hereinafter described in Example IV, it has been found that the charge may be introduced into a furnace maintained at a temperature below 1400° C. and that a satisfactory initial oxidizing heating may be effected by slowly raising the temperature to about 1400° C., and when this temperature has been reached, changing the conditions from oxidizing to mildly reducing. When employing small batches it is preferable to carry out the oxidizing heating to decrease the barium sulfate content of the charge to below about 40%, preferably between about 20% and 30%, before changing to reducing conditions. The use of an excess of air over that necessary for combustion of the fuel employed will give an oxidizing condition. This is evidenced by the presence of oxygen in the gaseous products of combustion. The presence of carbon monoxide and the absence of oxygen in the gaseous products of combustion indicate a reducing condition, the severity of which is a function of the amount of carbon monoxide present. If, during the initial heating, a reducing condition exists, barium sulfide will be formed and a hard, sintered mass will result. It will not be possible by continued heating to eliminate the sulfur from this hard, sintered mass. If at this point, heating under an oxidizing condition is continued, the barium sulfate content of the charge will not be appreciably decreased and at the end of 4 to 10 hours at about 1500° C. the product will contain from 10% to 30% barium sulfate. If, however, at the end of 1 hour at about 1500° C. the furnace atmosphere is changed to reducing, the sulfur elimination is markedly increased. A reducing condition at about 1500° C. for from 1 to 3 hours will lower the barium sulfate content of the furnace charge to from 1% to 4%. The times indicated here are by way of illustration, but the important considerations necessary are the barium sulfate content and the severity of the reducing action of the furnace atmosphere. The reducing condition should be mild until the barium sulfate content of the charge has dropped below 20%. When the barium sulfate content is below 10% then a strong reducing atmosphere may be employed. This technique assures the absence of a measurable amount of sulfide sulfur in the charge at any time. The reducing action of the furnace atmosphere must never be sufficient to produce sulfide sulfur but rather to simply remove the oxygen indicated by the reaction, $$6BaSO_4 + 2Al_2O_3 = 2Ba_3Al_2O_6 + 3O_2 + 6SO_2$$

From the foregoing it will be seen that when operating with furnaces fired by carbonaceous fuels such as coal, oil, gas and the like, the shift from oxidizing to reducing conditions is easily obtained merely by limiting the amount of air or oxidizing gas fed to the furnace with the fuel to insure combustion. As has been stated, oxidizing conditions will prevail when an excess of air over that required for complete combustion is introduced, which excess can be found in the exhaust gases. When reducing conditions prevail in the furnace, carbon monoxide produced by the incomplete combustion of the fuel will be found in the exhaust gases. Naturally, the present invention is adopted when employing electrical heating means, and in such cases, it is necessary to introduce, during the initial oxidizing heating period, air or other oxidizing gas thus to maintain within the electrically heated furnace an oxidizing atmosphere. The shift to reducing conditions in such a furnace is accomplished by the introduction of a reducing gas, for instance, carbon monoxide or alternatively, finely divided carbon, may be sprayed into the furnace above the mixture being heated. The finely divided carbon will not be completely burned to carbon dioxide because of the limited supply of oxygen available, but will form carbon monoxide and hence produce the reducing conditions.

It will further be observed from the foregoing that the initial oxidizing heating should be continued until the barium sulfate content of the charge is decreased to a minor portion of the entire charge. During the initial period of the reducing heating it is preferable that the reducing condition be rather mild in order to avoid the formation of sulfide sulfur until the barium sulfate content has dropped to 20% or less. By continuing the reducing treatment, it is possible to reduce the residual barium sulfate content of the barium aluminate produced according to the invention to less than 5%, generally between about 1% and 4%. This is a striking advance over prior art methods which produced barium aluminates, for instance, tribarium aluminates contaminated with considerably larger amounts well above 5% and frequently as much as 25% of residual barium sulfate.

When practicing the present invention the formation of the barium aluminate proceeds without liquefaction of the reaction mass. However, the products of the reaction are obtained as lumps larger in size than the particle of the reaction mixture, which indicates that sintering takes place during the formation of the barium aluminate.

The present invention is particularly adapted to the preparation of tribarium aluminate material which is of interest in the ceramic industry, in the treatment of water and as a source of soluble barium and alumina, for the preparation of barium salts and aluminates. When employing native forms of barium sulfate and aluminum oxide, for instance, barite and bauxite, these materials will contain impurities which are chiefly iron oxide and silica. These impurities do not seriously affect the operation of the present invention, and the proportions of barium sulfate material and aluminum oxide material may be determined without reference to these impurities on the basis of the respective content of BaO and $Al_2O_3$ contained in these materials. Thus, according to the invention, barium aluminates may be prepared varying in ratio of BaO to $Al_2O_3$ from 1:1 to 6:1.

The following example of a barium aluminate in which the ratio of BaO to $Al_2O_3$ was 3:1, is given by way of illustration, it being understood that the invention is not to be restricted to any specific temperatures or times of heating therein recited.

EXAMPLE I

A sample of barite ore was used which analyzed as follows:

| | Percent |
|---|---|
| $BaSO_4$ | 97.8 |
| $Al_2O_3$ | 0.1 |
| $Fe_2O_3$ | 0.9 |
| $SiO_2$ | 1.2 |

This barite was ground to give a 15% residue on a 325 mesh screen.

A bauxite was used which analyzed as follows:

| | Percent |
|---|---|
| $Al_2O_3$ | 63.0 |
| $SiO_2$ | 8.7 |
| $Fe_2O_3$ | 2.3 |
| Loss on ignition | 24.5 |

This ore was ground to give a 2% residue on 100 mesh. These two materials were mixed in the proportion of 700 lbs. barite and 160 lbs. bauxite, as an aqueous slurry by agitating in a tank equipped with a suitable stirring device for 4 hours. The aqueous mixture was pan dried and 100 lbs. of the mix charged to a small rotary oil fired furnace, lined with a refractory material high in alumina. The furnace was rotated and heated and 1500° C. was reached in 3½ hours under oxidizing conditions. The temperature and the oxidizing conditions were maintained for one hour at which time the conditions were adjusted to reducing. The reducing conditions were continued at the same temperature for an additional hour. The analysis of the product was as follows:

| | Percent |
|---|---|
| $BaSO_4$ | 3.0 |
| $SiO_2$ | 3.8 |
| $Al_2O_3$ and $Fe_2O_3$ | 21.8 |
| BaO | 71.4 |

Products varying in ratio of BaO to $Al_2O_3$ from 1:1 to 6:1 have been prepared by this same method, as illustrated by the following examples:

EXAMPLE II

BaO:$Al_2O_3$=6:1

280 grams of barite and 32 grams of bauxite prepared from the same materials and in the same manner as those used in Example I, were mixed wet, filtered and dried and placed in a magnesium oxide crucible in an oil-fired pot furnace, heated to about 1500° C. in 3½ hours under oxidizing conditions which were held for an additional hour. Reducing conditions were then started and maintained at about 1500° C. for 36 hours. The product formed contained 2.9% barium sulfate.

EXAMPLE III

BaO:$Al_2O_3$=1:1

233 grams of barite and 160 grams of bauxite prepared in the same manner of Example I were mixed wet, filtered and dried and then heated to about 1470° C. in 2½ hours under oxidizing conditions and held under these conditions for an additional hour. Reducing conditions were then started and maintained for 2 hours. The product formed contained 1.1% barium sulfate.

EXAMPLE IV

BaO:$Al_2O_3$=3:1

Barite and bauxite prepared from the same materials and in the same manner and in the same ratio as those used in Example I were mixed wet and dried on an external stream heated drum drier of the type commonly used in the chemical industries. Four tons of this dried batch were charged into an oil fired rotary Bruckner furnace equipped with a suitable refractory lining. This batch was charged into the furnace while the furnace was still hot from the previous batch and the temperature of the furnace at the time of charging was approximately 1100° C. Following the charging and the replacing of the charging door, the furnace was rotated slowly at the rate of one revolution every 4.5 minutes. This allowed the batch to heat up gradually and the bulk of the water contained in the bauxite to be driven off. Following this, the burner was lighted and at the end of an additional hour the temperature approximated 1400° C. At this point the burner adjustment was charged so that the condition in contact with the batch was mildly reducing. Due to the magnitude of the batch, this reducing effect was extremely mild when considering the batch in its entirety. This condition was maintained until the charge had been in the furnace a total of 7 hours from the time of charging or 6½ hours from the time of lighting the burner. At this point the temperature was about 1540° C. and the reaction was essentially complete. At this point the burner was adjusted to give an oxidizing condition to assure the elimination of any sulfide which may have inadvertently been formed and at the end of ½ hour under this oxidizing condition the burner was turned off and the batch discharged from the furnace.

*Analysis of the product*

| | Per cent |
|---|---|
| $BaSO_4$ | 2.4 |
| $SiO_2$ | 4.4 |
| $Fe_2O_3$ | 4.5 |
| $Al_2O_3$ | 17.0 |
| $BaO$ | 71.6 |
| | 99.9 |

The foregoing description of the present invention has been given for clearness of understanding. It is to be understood that modifications within the skill of the art are to be included within the scope of the claims appended hereto.

I claim:

1. Method of preparing barium aluminate which comprises heating a mixture consisting essentially of a barium sulfate material and an aluminum oxide material and containing no added carbonaceous material other than impurities at temperatures between about 1400° C. and about 1550° C., maintaining oxidizing conditions throughout said mixture during the heating until the barium sulfate content thereof is decreased to a minor portion of the mixture, then changing the conditions from oxidizing to reducing and continuing the heating within the said temperature range until the bearing sulfate is substantially completely eliminated.

2. Method of preparing barium aluminate which comprises heating a mixture consisting essentially of barite and bauxite and containing no added carbonaceous material other than impurities at temperatures between about 1400° C. and about 1550° C., maintaining oxidizing conditions throughout said mixture during the heating until the barium sulfate content thereof is decreased to below about 40% of the mixture, then changing the conditions from oxidizing to reducing and continuing the heating within the said temperature range until the barium sulfate is decreased below about 5%.

3. Method of preparing barium aluminate which comprises mixing ground barium sulfate material with ground aluminum oxide material in such proportions that for every one mol of available aluminum oxide, calculated as $Al_2O_3$, contained in the aluminum oxide material there will be present between one mol and six mols of available barium sulfate, calculated as $BaSO_4$, contained in the barium sulfate material, heating said mixture in the absence of added carbonaceous material other than impurities at temperatures between about 1400° C. and about 1550° C., maintaining oxidizing conditions throughout said mixture during the heating until the barium sulfate content thereof is decreased to a minor portion of the mixture then changing the conditions from oxidizing to reducing and continuing the heating within the said temperature range until the barium sulfate is substantially completely eliminated.

4. Method of preparing tribarium aluminate which comprises mixing ground barite with ground bauxite in such proportions that for every mol of aluminum oxide, calculated as $Al_2O_3$, contained in the bauxite there will be present about three mols of barium sulfate, calculated as $BaSO_4$, in the barite, heating said mixture in the absence of added carbonaceous material other than impurities at temperatures between about 1400° C. and about 1550° C., maintaining oxidizing conditions throughout said mixture during the heating until the barium sulfate content thereof is decreased to below about 40% of the mixture, then changing the conditions from oxidizing to reducing and continuing the heating within the said temperature range until the barium sulfate content is decreased to below about 5%.

FRANCIS J. WILLIAMS.